United States Patent
Xia et al.

(10) Patent No.: US 6,329,773 B1
(45) Date of Patent: Dec. 11, 2001

(54) EXCITATION CONTROL APPARATUS OF SYNCHRONOUS GENERATOR

(75) Inventors: Yuou Xia; Masaru Shimomura, both of Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/597,660

(22) Filed: Jun. 19, 2000

(30) Foreign Application Priority Data

Jan. 14, 2000 (JP) .................................................. 12-006993

(51) Int. Cl.$^7$ ....................................................... H02P 5/20
(52) U.S. Cl. ...................... 318/140; 318/568.22; 318/700
(58) Field of Search .............................. 318/140, 568.22, 318/700, 800; 315/209; 340/347; 323/257

(56) References Cited

U.S. PATENT DOCUMENTS

| | | | | |
|---|---|---|---|---|
| 4,286,194 | * | 8/1981 | Sherman | 323/257 |
| 4,330,815 | * | 5/1982 | Konishi | 363/35 |
| 4,591,831 | * | 5/1986 | D'Anci | 323/257 |

FOREIGN PATENT DOCUMENTS 2809833    7/1998  (JP) .

* cited by examiner

Primary Examiner—Karen Masih
(74) Attorney, Agent, or Firm—Leydig, Voit & Mayer, Ltd.

(57) ABSTRACT

A transmission voltage of a power transmission system in a transmission voltage control depends on a product of a voltage drooping factor and a difference between a reactive current of a synchronous generator and a reference value. The voltage drooping factor depends on a gain and a voltage-up ratio of a transformer arranged between the power transmission system and the synchronous generator. The voltage-up ratio changes with a tap position of the transformer. The tap position of the transformer is always detected to update the voltage-up ratio, the gain is determined according to the updated voltage-up ratio to maintain the voltage drooping factor at a constant value, and the transmission voltage is regulated by using the gain. Therefore, even though the tap position of the transformer is changed, the voltage drooping factor is maintained at a constant value, and the stability of the transmission voltage of the power transmission system is maintained.

14 Claims, 5 Drawing Sheets

EXCITATION CONTROL APPARATUS OF SYNCHRONOUS GENERATOR

BACKGROUND OF THE INVENTION

1. Field of the Invention

The present invention relates to an excitation control apparatus of a synchronous generator used to improve the voltage stability of an electric power system.

2. Description of Related Art

Figure 5:
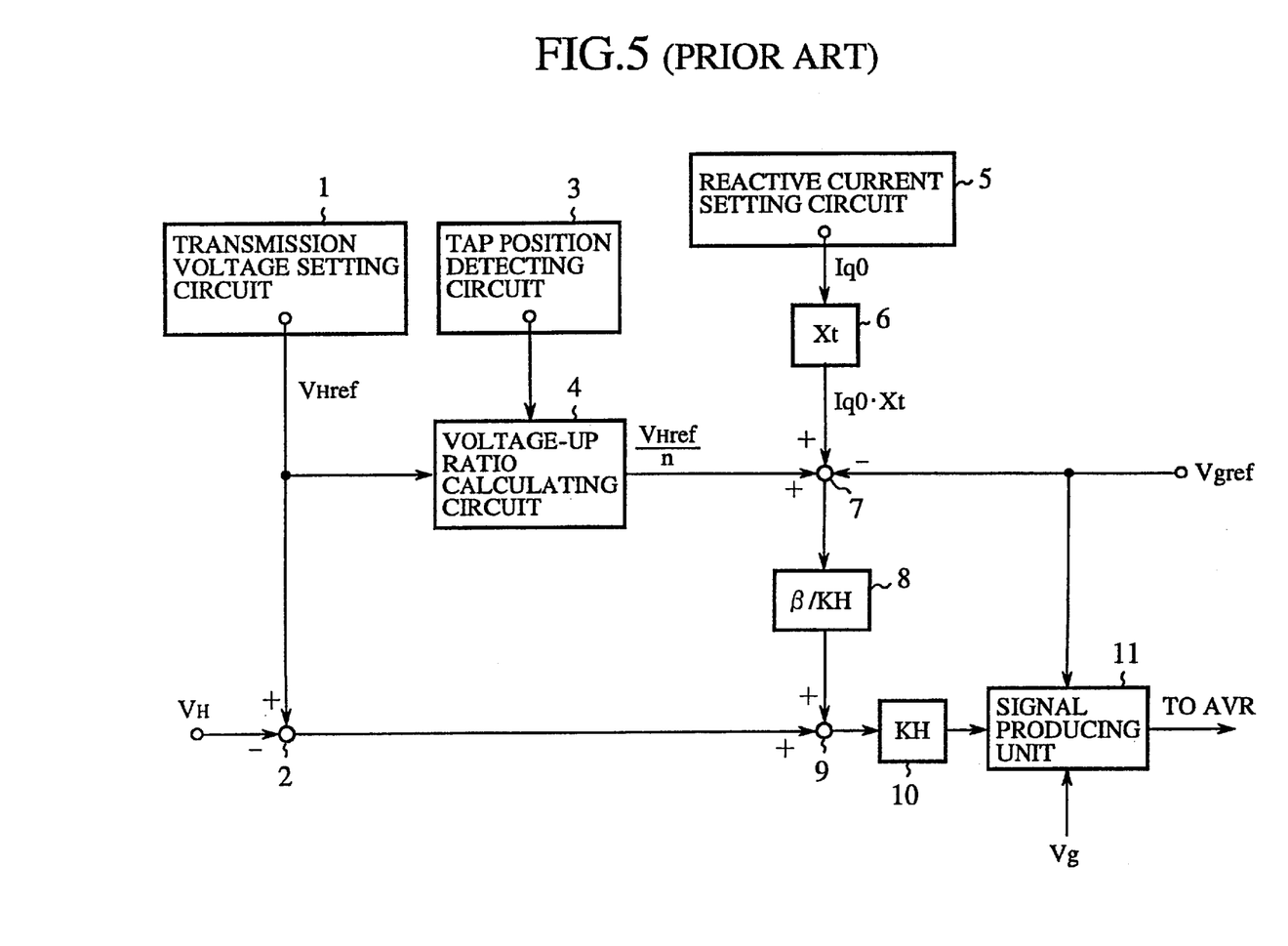
FIG. 5 is a constitutional block diagram of a conventional excitation control apparatus of a synchronous generator.

FIG. 5 is a constitutional block diagram of a conventional excitation control apparatus of a synchronous generator.

In FIG. 5, a reference numeral 1 indicates a transmission voltage setting circuit for setting a transmission voltage of a power transmission system (not shown) to a reference value $V_{Href}$. The transmission voltage of the power transmission system relates to a high voltage on a high voltage side of a transformer (not shown) arranged between a synchronous generator (not shown) and the power transmission system. A reference numeral 2 indicates a subtracting unit for subtracting a transmission voltage $V_H$ actually applied to the power transmission system from the reference value $V_{Href}$ of the transmission voltage set in the transmission voltage setting circuit 1, a reference numeral 3 indicates a tap position detecting circuit for detecting a tap position of the transformer, and a reference numeral 4 indicates a voltage-up ratio calculating circuit for calculating the inverse value of a voltage-up ratio n of the transformer from the tap position of the transformer detected in the tap position detecting circuit 3 and multiplying the reference value $V_{Href}$ of the transmission voltage $V_H$ by the inverse $1/n$ of the voltage-up ratio n.

A reference numeral 5 indicates a reactive current setting circuit for setting a reference value of a reactive current Iq of the synchronous generator to a value Iq0, a reference numeral 6 indicates a multiplier for multiplying the reference value Iq0 of the reactive current Iq set in the reactive current setting circuit 5 by a rated reactance value Xt of the transformer, a reference numeral 7 indicates an adding and subtracting unit for adding a multiplied result $V_{Href}/n$ of the voltage-up ratio calculating circuit 4 and a multiplied result Iq0*Xt of the multiplier 6 together and subtracting a reference value $V_{gref}$ of a terminal voltage Vg of the synchronous generator from an added result $V_{Href}/n + Iq0*Xt$, a reference numeral 8 indicates a multiplier for multiplying an added-subtracted result $V_{Href}/n + Iq0*Xt - V_{gref}$ of the adding and subtracting unit 7 by a divided result $\beta/KH$ obtained by dividing a gain reducing coefficient $\beta$ by a gain KH of a transmission voltage control, a reference numeral 9 indicates an adder for adding a subtracted result $V_{Href} - V_H$ of the subtracting unit 2 and a multiplied result $\beta/KH*(V_{Href}/n + Iq0*Xt - V_{gref})$ of the multiplier 8, a reference numeral 10 indicates a multiplier for multiplying an added result $V_{Href} - V_H + \beta/KH*(V_{Href}/n + Iq0*Xt - V_{gref})$ of the adder 9 by the gain KH of the transmission voltage control, and a reference numeral 11 indicates a signal producing unit for multiplying a deviation $(V_{gref} - Vg)$ between the reference value $V_{gref}$ of the terminal voltage Vg of the synchronous generator and the terminal voltage Vg by the gain reducing coefficient $\beta$ to obtain a multiplied result $\beta*(V_{gref} - Vg)$ and adding this multiplied result $\beta*(V_{gref} - Vg)$ and a multiplied result $KH(V_{Href} - V_H) + \beta*(V_{Href}/n + Iq0*Xt - V_{gref})$ of the multiplier 10 to obtain an added result.

In the above configuration, an operation of the conventional excitation control apparatus is described.

In the example shown in FIG. 5, the added result of the signal producing unit 11 is output to an auto-voltage regulating unit AVR (not shown), and the transmission voltage $V_H$ of the power transmission system is controlled according to the added result to make the transmission voltage $V_H$ agree with the reference value $V_{Href}$.

In cases where a transmission voltage control is performed to control the transmission voltage $V_H$ of the power transmission system to a constant value, the transmission voltage $V_H$ is expressed according to an equation (1).

$$V_H = V_{Href} - n*\beta*Xt/(\beta + n*KH)*(Iq - Iq0) \quad (1)$$

Here, in the reactive current setting circuit 5, the reactive current Iq of the synchronous generator is set to the reference value Iq0 in cases where the transmission voltage $V_H$ agrees with the reference value $V_{Href}$.

Therefore, as is apparently indicated in the equation (1), in cases where the synchronous generator is operated on condition that the reactive current Iq of the synchronous generator almost agrees with the reference value Iq0, the transmission voltage $V_H$ of the power transmission system can be maintained to the reference value $V_{Href}$ or a value near to the reference value $V_{Href}$.

In contrast, in cases where the terminal voltage Vg of the synchronous generator is controlled to a constant value, the transmission voltage $V_H$ is expressed according to an equation (2).

$$V_H = n*V_{gref} - nr*Iq*Xt \quad (2)$$

Here, the symbol nr denotes a reactance change ratio of the transformer.

As is apparently indicated by comparing the equations (1) and (2) with each other, in the transmission voltage control in which the transmission voltage $V_H$ of the power transmission system is controlled to a constant value, as compared with a terminal voltage control in which the terminal voltage Vg of the synchronous generator is controlled to a constant value, a possibility of the decrease of the transmission voltage caused by a reactance change of the transformer is low, and an adverse influence of the change of the reactive current Iq is low. Therefore, the transmission voltage $V_H$ of the power transmission system can be stabilized.

Also, in the terminal voltage control in which the terminal voltage Vg of the synchronous generator is controlled to a constant value, when the voltage of the power system is lowered, the reactive current Iq of the synchronous generator is increased, and the voltage $V_H$ on the high voltage side of the transformer is lowered in proportion to the system voltage. In contrast, in the transmission voltage control in which the transmission voltage $V_H$ of the power transmission system is controlled to a constant value, even though the system voltage of the power system is lowered, because a lowering degree of the reactance of the transformer is recovered by heightening the terminal voltage vg of the synchronous generator, the lowering of the voltage on the high voltage side of the transformer can be prevented.

Accordingly, because the conventional excitation control apparatus of the synchronous generator is constituted as is described above, the voltage stability of the power transmission system can be effectively improved.

However, in cases where the tap position of the transformer is changed, though the voltage-up ratio n of the transformer and the reactance value of the transformer are changed, because the transmission voltage $V_H$ is controlled by using the gain KH set to a constant value, there is a drawback that the transmission voltage $V_H$ becomes instable. In detail, there are following drawbacks.

First Drawback:

In cases where an accident of a wiring or a sharp increase of a load occurs, the transmission voltage $V_H$ of the power transmission system is sharply lowered, i.e., droops. In this case, it is required to set the terminal voltage Vg of the synchronous generator to a higher value for the purpose of maintaining the transmission voltage $V_H$.

However, when the terminal voltage Vg of the synchronous generator exceeds its upper limit, an auto-tap-control function OLTC of the transformer is normally operated, and a tap value of the transformer is changed to a tap value of a loading operation. As a result, the voltage-up ratio n of the transformer is heightened, and the terminal voltage Vg of the synchronous generator is returned to its rated value or a value near to the rated value.

In this case, when the tap position of the transformer is changed, because the voltage-up ratio n of the transformer and the reactance value of the transformer are changed, a voltage drooping factor in the transmission voltage control, which denotes the coefficient n*β*Xt/(β+n*KH) of the second term (Iq–Iq0), changes. Therefore, in cases where a plurality of synchronous generators are connected with the same bus of the power transmission system through a transformer and are operated in parallel to each other, because the transmission voltage $V_H$ to be controlled is common to the synchronous generators, when a transmission voltage characteristic of each synchronous generator is changed, the reactive currents Iq of the synchronous generators are put out of balance. Therefore, there is a first drawback that the instability of the transmission voltage $V_H$ of the power transmission system easily occur.

Second Drawback:

As a type of three-winding-wire transformer frequently used, a shell type transformer and a core-type transformer are known. Characteristics of the shell type transformer are similar to those of a split type wiring transformer. That is, because the voltage-up ratio n depending on the tap position changes in proportion to the reactance changing ratio nr in the shell type transformer, the relationship between the transmission voltage $V_H$ of the power transmission system and the terminal voltage Vg of the synchronous generator is expressed according to an equation (3).

$$V_H = n*Vg - n*Xt*Iq \quad (3)$$

Also, in cases where the transmission voltage control is performed to control the transmission voltage VH of the power transmission system to a constant value, the transmission voltage VH is expressed in the same manner as in the equation (1).

However, in case of the core-type transformer, because the change of the voltage-up ratio n depending on the tap position is not proportional to the change of the reactance changing ratio nr, the relationship between the transmission voltage VH of the power transmission system and the terminal voltage Vg of the synchronous generator is expressed according to an equation (4).

$$V_H = n*Vg - nr*Xt*Iq \quad (4)$$

Therefore, in cases where the transmission voltage VH of the power transmission system is controlled to a constant value, the transmission voltage VH is expressed according to an equation (5).

$$V_H = V_{Href} - \beta*Xt/(\beta+n*KH)*(nr*Iq - n*Iq0) \quad (5)$$

In this equation (5) for the core-type transformer, in cases where the transmission voltage VH of the power transmission system agrees with the reference value VHref, Iq=(n/nr)*Iq0 is satisfied. In other words, even though the transmission voltage VH is controlled to agree with its reference value VHref, the synchronous generator is operated while undesirably deviating the reactive current Iq of the synchronous generator from its reference value Iq0 by a value (n/nr–1)*Iq0 relating to the coefficient (n/nr).

Also, in cases where one core-type transformer, of which the tap position is set to a rated position, is connected with two synchronous generators, even though the reactance (or the reactance changing ratio nr) of the core-type transformer for one synchronous generator agrees with that for the other synchronous generator, when the tap position of the core-type transformer is changed, the reactance changing ratio nr of the core-type transformer for one synchronous generator is increased or decreased in the opposite to the decrease or increase of the reactance changing ratio nr of the core-type transformer for the other synchronous generator. In this case, the reactive currents Iq of the two synchronous generators connected with the core-type transformer are changed in the opposite direction to each other, and the voltage drooping factors for the two synchronous generators in the transmission voltage control are changed in the opposite direction from each other. Therefore, there is a second drawback that the transmission voltage control becomes instable and the reactive currents Iq of the two synchronous generators are put out of balance in case of the core-type transformer.

SUMMARY OF THE INVENTION

An object of the present invention is to provide, with due consideration to the drawbacks of the conventional excitation control apparatus of the synchronous generator an excitation control apparatus of a synchronous generator in which the stability of a transmission voltage in a power transmission system is maintained even though a tap position of a transformer connected with the synchronous generator is changed. The object is achieved by the provision of an excitation control apparatus of a synchronous generator, comprising:

tap position detecting means for detecting a tap position of a transformer arranged between a synchronous generator and a power transmission system;

drooping gain calculating means for calculating a drooping gain of a transmission voltage control according to the tap position of the transformer detected by the tap position detecting means to maintain a drooping factor of the power transmission system in the transmission voltage control to a constant value; and voltage control means for controlling a transmission voltage of the power transmission system according to the drooping gain calculated by the drooping gain calculating means and a prescribed value.

As is well known, the transmission voltage of the power transmission system in the transmission voltage control depends on a term composed of a reactive current of the synchronous generator and a reference value of the reactive current of the synchronous generator, and a coefficient of the term is called the drooping factor depending on the tap position and the drooping gain.

In the above configuration, the drooping gain is calculated according to the tap position of the transformer by the drooping gain calculating means. Therefore, even though the tap position of the transformer is changed, because the drooping gain changes with the tap position of the transformer to maintain the drooping factor to a constant value.

Accordingly, because the drooping factor is always maintained to a constant value, even though the tap position of the transformer is changed, the stability of the transmission voltage of the power transmission system in the transmission voltage control can be maintained.

It is preferred that the drooping gain calculating means comprises:
- an operation value setting circuit for setting a drooping factor of the power transmission system in the transmission voltage control;
- a voltage-up ratio calculating circuit for calculating a voltage-up ratio of the transformer from the tap position of the transformer detected by the tap position detecting means; and
- a drooping gain calculating circuit for calculating the drooping gain in the transmission voltage control from the drooping factor set by the operation value setting circuit and the voltage-up ratio calculated by the voltage-up ratio calculating circuit.

In the above configuration, the drooping factor in the transmission voltage control depends on the voltage-up ratio of the transformer corresponding to the tap position of a transformer and the drooping gain. Because the drooping gain is determined according to the drooping factor and the voltage-up ratio of the transformer, in cases where the transmission voltage of the power transmission system is controlled according to the drooping gain, the drooping factor is maintained to the value set by the operation value setting circuit as a matter of course.

Accordingly, the drooping factor can be easily maintained to a constant value by calculating the drooping gain.

It is also preferred that the synchronous generator is composed of one or more synchronous generators and the drooping factor is set by the operation value setting circuit according to the number of synchronous generators.

In the above configuration, even though one or more synchronous generators are connected with the transformer, reactive currents of the synchronous generators can be well-balanced.

It is also preferred that the drooping gain calculating circuit divides a rated reactance value of the transformer by the drooping factor set by the operation value setting circuit to produce a divided result, subtracts an inverse value of the voltage-up ratio of the transformer from the divided result to produce a subtracted result and multiplies the subtracted result by a gain reducing coefficient.

In the above configuration, the drooping gain can be easily calculated in the drooping gain calculating circuit.

It is also preferred that the drooping gain in the transmission voltage control is always calculated in an on-line operation by the drooping gain calculating means.

In the above configuration, the drooping gain is renewed by the drooping gain calculating means each time the tap position of the transformer is changed.

Accordingly, an appropriate drooping gain can be immediately obtained when the tap position of the transformer is changed.

It is also preferred that the voltage control means comprises a revising means for revising a reference value of a reactive current of the synchronous generator to a revised reference value according to the tap position of the transformer detected by the tap position detecting means, and the revised reference value is used as the prescribed value by the voltage control means.

In cases where a core-type transformer is used as the transformer, the change of a voltage-up ratio depending on the tap position is not proportional to the change of a reactance changing ratio. In this case, even though the transmission voltage of the power transmission system is controlled in the transmission voltage control to its reference value by the voltage control means, the reactive current of the synchronous generator is deviated from its reference value.

In the above configuration, because the reference value of the reactive current is revised, the reactive current of the synchronous generator agrees with its reference value.

Accordingly, even though the core-type transformer is used as the transformer, the occurrence of a deviation of the reactive current of the synchronous generator from its reference value can be prevented.

It is also preferred that the drooping gain calculating means comprises:
- an operation value setting circuit for setting a drooping factor of the power transmission system in the transmission voltage control and setting the reference value of the reactive current of the synchronous generator;
- a voltage-up ratio calculating circuit for calculating a voltage-up ratio of the transformer from the tap position of the transformer detected by the tap position detecting means;
- a reactance changing ratio calculating circuit for calculating a reactance changing ratio of the transformer from the tap position of the transformer detected by the tap position detecting means; and
- a drooping gain calculating circuit for calculating the drooping gain in the transmission voltage control from the drooping factor set by the operation value setting circuit, the voltage-up ratio calculated by the voltage-up ratio calculating circuit and the reactance changing ratio calculated by the reactance changing ratio calculating circuit.

In cases where a core-type transformer is used as the transformer, the drooping factor in the transmission voltage control depends on the voltage-up ratio of the transformer corresponding to the tap position of the transformer, the drooping gain and the reactance changing ratio of the transformer corresponding to the tap position of the transformer.

In the above configuration, because the drooping gain is determined according to the drooping factor, the voltage-up ratio of the transformer and the reactance changing ratio of the transformer, in cases where the transmission voltage of the power transmission system is controlled according to the drooping gain, the drooping factor is maintained to the value set by the operation value setting circuit as a matter of course.

Accordingly, in cases where a core-type transformer is used as the transformer, even though the tap position of the transformer is changed, the stability of the transmission voltage of the power transmission system in the transmission voltage control can be maintained.

It is also preferred that the drooping gain calculating circuit multiplies the reactance changing ratio calculated by the reactance changing ratio calculating circuit by a rated reactance value of the transformer to produce a multiplied result, divides the multiplied result by another multiplied result, which is obtained by multiplying the drooping factor set by the operation value setting circuit by the voltage-up ratio calculated by the voltage-up ratio calculating circuit, to produce a divided result, subtracts an inverse value of the voltage-up ratio of the transformer from the divided result to produce a subtracted result and multiplies the subtracted result by a gain reducing coefficient to obtain the drooping gain.

In the above configuration, the drooping gain, which is required to maintain the drooping factor in the transmission voltage control to a constant value, can be precisely calculated.

It is also preferred that the revising means divides the reactance changing ratio calculated by the reactance changing ratio calculating circuit by the voltage-up ratio calculated by the voltage-up ratio calculating circuit to produce a divided result and multiplies the divided result by the reference value of the reactive current to produced the revised reference value.

In the above configuration, the reference value of the reactive current can be easily revised to the revised reference value.

It is also preferred that the reference value of the reactive current of the synchronous generator is always revised to the revised reference value in an on-line operation by the revising means.

In the above configuration, even though the tap position of the transformer is changed, the occurrence of a deviation of the reactive current of the synchronous generator from its revised reference value can be reliably prevented.

It is also preferred that the excitation control apparatus of the synchronous generator further comprises:

reactive current detecting means for detecting an reactive current of the synchronous generator; and compensating means for compensating a reference value of the reactive current of the synchronous generator for the change of the tap position by using the reactive current of the synchronous generator detected by the reactive current detecting means and the tap position detected by the tap position detecting means, the reference value being used as the prescribed value by the voltage control means.

In the above configuration, in cases where a core-type transformer is used as the transformer, even though the tap position of the transformer is changed, the occurrence of a deviation of the reactive current of the synchronous generator from its revised reference value can be reliably prevented.

It is also preferred that, in addition to the compensating means, the drooping gain calculating means comprises:

an operation value setting circuit for setting a drooping factor of the power transmission system in the transmission voltage control and setting the reference value of the reactive current of the synchronous generator;

a voltage-up ratio calculating circuit for calculating a voltage-up ratio of the transformer from the tap position of the transformer detected by the tap position detecting means; and a drooping gain calculating circuit for calculating the drooping gain in the transmission voltage control from the drooping factor set by the operation value setting circuit and the voltage-up ratio calculated by the voltage-up ratio calculating circuit.

In the above configuration, even though a core-type transformer is used as the transformer, because the compensating means compensates the reference value of the reactive current of the synchronous generator for the change of the tap position, the drooping factor in the transmission voltage control depends on the voltage-up ratio of the transformer corresponding to the tap position of a transformer and the drooping gain. Because the drooping gain is determined according to the drooping factor and the voltage-up ratio of the transformer, in cases where the transmission voltage of the power transmission system is controlled according to the drooping gain, the drooping factor is maintained to the value set by the operation value setting circuit as a matter of course.

Accordingly, even though a core-type transformer is used as the transformer, the drooping factor can be easily maintained to a constant value by calculating the drooping gain, and the stability of the transmission voltage in the transmission voltage control can be maintained.

It is also preferred that the compensating means calculates a reactance changing ratio of the transformer from the tap position detected by the tap position detecting means, subtracts the voltage-up ratio calculated by the voltage-up ratio calculating circuit from the reactance changing ratio to produce a subtracted result, divides the subtracted result by the voltage-up ratio to produce a divided result, multiplies the reactive current of the synchronous generator by the divided result to produce a multiplied result and adds the multiplied result to the reference value of the reactive current set by the operation value setting circuit to compensate the reference value of the reactive current of the synchronous generator for the change of the tap position.

In the above configuration, the compensation of the reference value of the reactive current can be easily performed.

It is also preferred that the compensation of the reference value of the reactive current of the synchronous generator is always performed in an on-line operation by the compensating means.

In the above configuration, even though the tap position of the transformer is changed, the occurrence of a deviation of the reactive current of the synchronous generator from its revised reference value can be reliably prevented.

The object is also achieved by the provision of an excitation control apparatus of a synchronous generator, comprising:

tap position detecting means for detecting a tap position of a transformer arranged between a synchronous generator and a power transmission system;

reactive current detecting means for detecting an reactive current of the synchronous generator;

compensating means for compensating a reference value of the reactive current of the synchronous generator for the change of the tap position by using the reactive current of the synchronous generator detected by the reactive current detecting means and the tap position detected by the tap position detecting means; and voltage control means for controlling a transmission voltage of the power transmission system according to the reference value of the reactive current compensated by the compensating means.

In the above configuration, because the compensating means compensates the reference value of the reactive current of the synchronous generator for the change of the tap position, even though a core-type transformer is used as the transformer, the transmission voltage of the power transmission system can be controlled by the voltage control means in the same manner as in the use of a shell type transformer.

Accordingly, the occurrence of a deviation of the reactive current of the synchronous generator from its revised reference value can be prevented.

It is preferred that the compensating means calculates a voltage-up ratio of the transformer and a reactance changing ratio of the transformer from the tap position detected by the tap position detecting means, subtracts the voltage-up ratio from the reactance changing ratio to produce a subtracted result, divides the subtracted result by the voltage-up ratio to produce a divided result, multiplies the reactive current of the synchronous generator by the divided result to produce a multiplied result and adds the multiplied result to the reference value of the reactive current to compensate the reference value of the reactive current of the synchronous generator for the change of the tap position.

In cases where a core-type transformer is used as the transformer, the change of the voltage-up ratio is not proportional to the change of the reactance changing ratio, so that a deviation of the reactive current of the synchronous generator from its revised reference value occurs.

In the above configuration, because the compensating means compensates the reference value of the reactive current of the synchronous generator for the change of the tap position according to the voltage-up ratio and the reactance changing ratio, the compensation of the reference value of the reactive current can be easily performed, and the occurrence of a deviation of the reactive current of the synchronous generator from its revised reference value can be reliably prevented.

It is also preferred that the compensation of the reference value of the reactive current of the synchronous generator is always performed in an on-line operation by the compensating means.

In the above configuration, even though the tap position of the transformer is changed, the occurrence of a deviation of the reactive current of the synchronous generator from its revised reference value can be reliably prevented.

DETAILED DESCRIPTION OF THE PREFERRED EMBODIMENTS

The invention will now be described with reference to the accompanying drawings.

Embodiment 1

Figure 1:
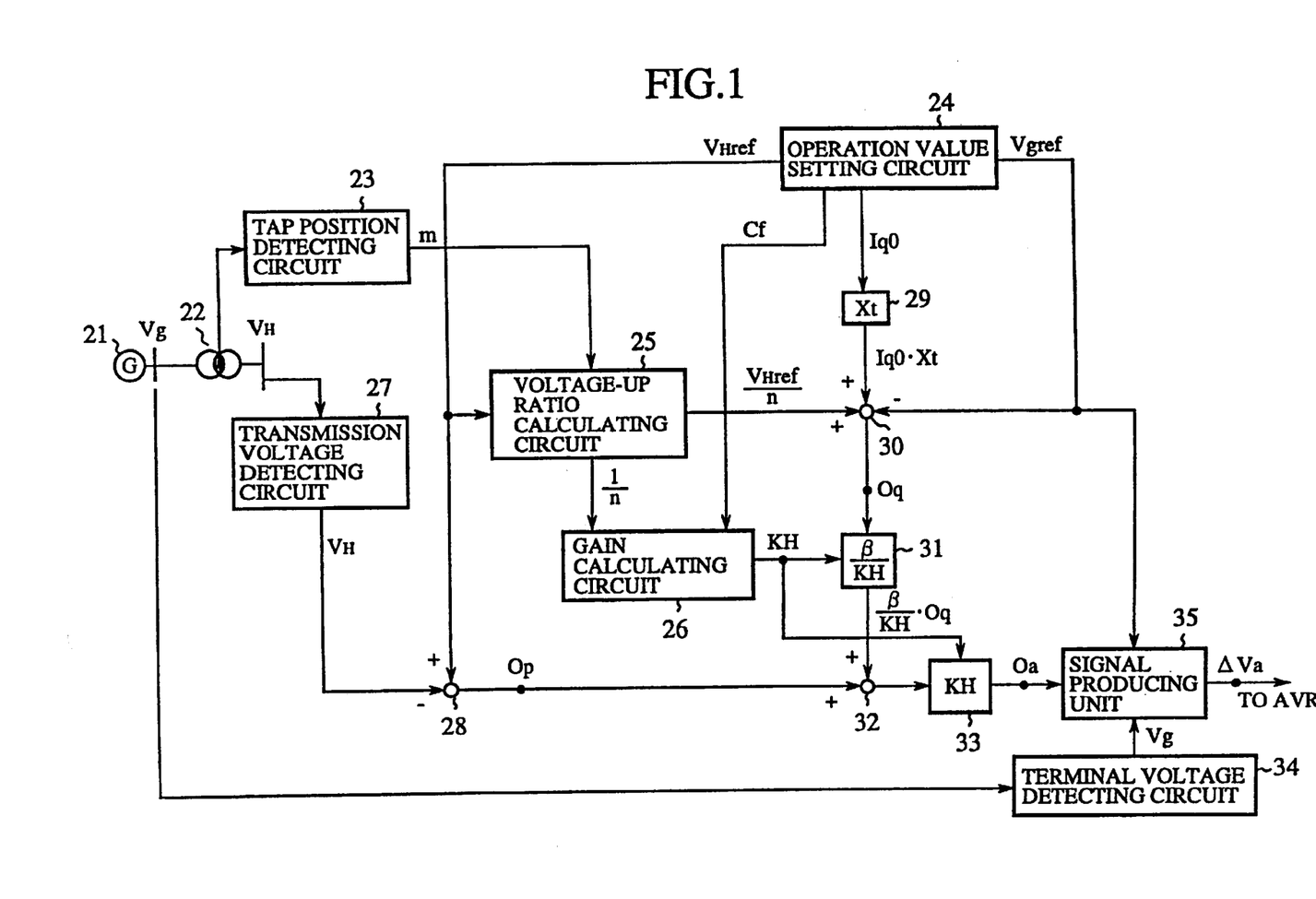
FIG. 1 is a constitutional diagram of an excitation control apparatus of a synchronous generator according to a first embodiment of the present invention.

FIG. 1 is a constitutional diagram of an excitation control apparatus of a synchronous generator according to a first embodiment of the present invention.

In FIG. 1, a reference numeral 21 indicates a synchronous generator, a reference numeral 22 indicates a transformer arranged between the synchronous generator and a power transmission system, a reference numeral 23 indicates a tap position detecting circuit (functioning as a tap position detecting means) for detecting a tap position m of the transformer 22, a reference numeral 24 indicates an operation value setting circuit for setting a voltage drooping factor Cf of the power transmission system in a transmission voltage control, a reference value $V_{Href}$ of a transmission voltage $V_H$, a reference value Iq0 of a reactive current Iq of the synchronous generator 21 and a reference value $V_{gref}$ of a terminal voltage Vg of the synchronous generator 21, a reference numeral 25 indicates a voltage-up ratio calculating circuit for calculating an inverse value of a voltage-up ratio n of the transformer 22 from the tap position m of the transformer 22 detected in the tap position detecting circuit 23 and multiplying the reference value $V_{Href}$ of the transmission voltage $V_H$ set in the operation value setting circuit 24 by the inverse value of the voltage-up ratio n, a reference numeral 26 indicates a gain calculating circuit for calculating a gain KH of the transmission voltage control from the voltage drooping factor Cf set in the operation value setting circuit 24 and the inverse value of the voltage-up ratio n calculated in the voltage-up ratio calculating circuit 25.

Here, the gain calculating means is composed of the operation value setting circuit 24, the voltage-up ratio calculating circuit 25 and the gain calculating circuit 26.

A reference numeral 27 indicates a transmission voltage detecting circuit for detecting the transmission voltage $V_H$ actually applied to a power transmission system, a reference numeral 28 indicates a subtracting unit for subtracting the transmission voltage $V_H$ detected in the transmission voltage detecting circuit 27 from the reference value $V_{Href}$ of the transmission voltage $V_H$ set in the operation value setting circuit 24 to obtain a subtracting result Op=$V_{Href}$−$V_H$, a reference numeral 29 indicates a multiplier for multiplying the reference value Iq0 of the reactive current Iq set in the operation value setting circuit 24 by a rated reactance value Xt of the transformer 22, a reference numeral 30 indicates an adding and subtracting unit for adding a multiplied result $V_{Href}/n$ of the voltage-up ratio calculating circuit 25 and a multiplied result Iq0*Xt of the multiplier 29 together and subtracting the reference value $V_{gref}$ of the terminal voltage Vg set in the operation value setting circuit 24 from an added result $V_{Href}/n$+Iq0*Xt to obtain an added-subtracted result Oq=Iq0*Xt−$V_{gref}$+$V_{Href}/n$, a reference numeral 31 indicates a multiplier for multiplying the added-subtracted result Oq obtained in the adding and subtracting unit 30 by a divided result (β/KH) obtained by dividing a gain reducing coefficient β by the gain KH calculated in the gain calculating circuit 26, a reference numeral 32 indicates an adding unit for adding the subtracting result Op obtained in the subtracting unit 28 and a multiplying result(β/KH)*Oq of the multiplier 31 together, a reference numeral 33 indicates an amplifier for amplifying an adding result Op+(β/KH)*Oq of the adding unit 32 by the gain KH of the transmission voltage control calculated in the gain calculating circuit 26 to obtain a multiplying result Oa=KH*{Op+(β/KH)*Oq}, a reference numeral 34 indicates a terminal voltage detecting circuit for detecting the terminal voltage Vg of the synchronous generator 21, and a reference numeral 35 indicates a signal producing unit for multiplying a deviation ($V_{gref}$−Vg) between the reference value $V_{gref}$ of the terminal voltage Vg of the synchronous generator 21 set in the operation value setting circuit 24 and the terminal voltage Vg detected in the terminal voltage detecting circuit 34 by the gain reducing coefficient β to obtain a multiplied result β*($V_{gref}$−Vg) and adding this multiplied result β($V_{gref}$−Vg) and the multiplied result Oa of the multiplier 33 to obtain an added result ΔVa.

Here, a voltage control means is composed of the transmission voltage detecting circuit 27, the subtracting unit 28, the amplifier 29, the adding and subtracting unit 30, the amplifier 31, the adding unit 32, the amplifier 33, the terminal voltage detecting circuit 34 and the signal producing unit 35.

In the above configuration, an operation of the excitation control apparatus of the synchronous generator 21 is described.

The above-described first drawback is solved in this first embodiment. That is, even though the tap position m of the transformer 22 is changed, the gain KH corresponding to the tap position m of the transformer 22 is always calculated in an on-line operation so as to maintain the voltage drooping factor Cf in a transmission voltage control, in which the transmission voltage $V_H$ of the power transmission system is controlled to a constant value, to be a constant value.

In brief, the voltage drooping factor Cf in the transmission voltage control is set in advance in the operation value setting circuit 24 while considering the number of synchronous generators and/or conditions of the power transmission system.

$$Cf = n*\beta*Xt/(\beta+n*KH) \quad (6)$$

The equation (6) is rewritten to an equation (7) to obtain the gain KH.

$$KH = \beta*(Xt/Cf - 1/n) \quad (7)$$

The voltage-up ratio n of the transformer 22 is calculated in correspondence to the tap position m of the transformer 22 each time the tap position m is changed, and the gain KH of the equation (7) is calculated by use of the voltage-up ratio n. Therefore, because the gain KH of the transmission voltage control corresponding to the tap position m of the transformer 22 is calculated, the voltage drooping factor Cf in the transmission voltage control is maintained at a constant value even though the tap position m of the transformer 22 is changed.

An operation of the excitation control apparatus is described in detail.

In the operation value setting circuit 24, a voltage drooping factor Cf of the power transmission system in the transmission voltage control is initially set while considering conditions of the power transmission system and the like, and a reference value $V_{Href}$ of a transmission voltage $V_H$, a reference value Iq0 of a reactive current Iq of the synchronous generator 21 and a reference value $V_{gref}$ of a terminal voltage Vg of the synchronous generator 21 are initially set.

In this case, as the number of synchronous generators 21 operated in parallel to each other is increased, it becomes more difficult to obtain well-balanced reactive currents Iq of the synchronous generators 21. Therefore, the voltage drooping factor Cf in the transmission voltage control is set to a high value. In contrast, in cases where the number of synchronous generators 21 operated in parallel to each other is decreased, the voltage drooping factor Cf in the transmission voltage control is set to a lower value.

Thereafter, when the transmission voltage VH actually applied to the power transmission system is detected in the transmission voltage detecting circuit 27, the transmission voltage VH is subtracted in the subtracting unit 28 from the reference value VHref of the transmission voltage VH set in the operation value setting circuit 24, and a subtracting result Op is output from the subtracting unit 28 to the adding unit 32.

$$Op = V_{Href} - V_H \quad (8)$$

Also, an inverse value of a voltage-up ratio n of the transformer 22 is calculated in the voltage-up ratio calculating circuit 25 from the tap position m of the transformer 22 detected in the tap position detecting circuit 23, the reference value VHref of the transmission voltage VH is multiplied by the inverse value of the voltage-up ratio n in the voltage-up ratio calculating circuit 25, and the reference value Iq0 of the reactive current Iq set in the operation value setting circuit 24 is multiplied by a rated reactance value Xt of the transformer 22 in the multiplier 29. Thereafter, a multiplied result VHref/n of the voltage-up ratio calculating circuit 25 and a multiplied result Iq0*Xt of the multiplier 29 are added together in the adding and subtracting unit 30, and the reference value Vgref of the terminal voltage Vg of the synchronous generator 21 is subtracted from an added result VHref/n+Iq0*Xt in the adding and subtracting unit 30 to obtain an added-subtracted result Oq.

$$Oq = Iq0*Xt - V_{gref} + V_{Href}/n \quad (9)$$

Thereafter, when the voltage drooping factor Cf is set in the operation value setting circuit 24 and the inverse value of the voltage-up ratio n is calculated in the voltage-up ratio calculating circuit 25, the gain KH of the transmission voltage control is calculated by using the voltage drooping factor Cf and the inverse value of the voltage-up ratio n (refer to the equation (7)).

Thereafter, in the multiplier 31, a gain reducing coefficient $\beta$ is divided by the gain KH calculated in the gain calculating circuit 26, the added-subtracted result Oq obtained in the adding and subtracting unit 30 is multiplied by a divided result $\beta/KH$.

After the subtracting result Op obtained in the subtracting unit 28 and a multiplying result $(\beta/KH)*Oq$ of the multiplier 31 are added together in the adding unit 32, an adding result $Op+(\beta/KH)*Oq$ of the adding unit 32 is multiplied by the gain KH of the transmission voltage control in the amplifier 33, and a multiplying result Oa is output to the signal producing unit 35.

$$Oa = KH*\{Op+(\beta/KH)*Oq\} \quad (10)$$

In the signal producing unit 35, a deviation between the reference value Vgref set in the operation value setting circuit 24 and the terminal voltage Vg detected in the terminal voltage detecting circuit 34 is multiplied by the gain reducing coefficient $\beta$, and this multiplied result $\beta*(V_{gref}-Vg)$ and the multiplied result Oa of the multiplier 33 are added together to obtain an added result $\Delta Va$.

$$\Delta Va = \beta*(V_{gref}-Vg)+Oa \quad (11)$$

The added result $\Delta Va$ is output to an auto-voltage regulator AVR(not shown).

Thereafter, the terminal voltage vg of the synchronous generator 21 is regulated according to the added result $\Delta Va$ in the auto-voltage regulator AVR to control the transmission voltage VH to a constant value. In cases where the synchronous generator 21 is operated in a steady state, $\Delta Va=0$ is satisfied. Also, the relationship between the terminal voltage Vg of the synchronous generator 21 and the transmission voltage VH is expressed according to the equation (3).

Therefore, the equation (1) is obtained by rearranging the equation (11) by use of the equation (3), the equation (8), the equation (9), the equation (10) and $\Delta Va=0$.

Also, the transmission voltage $V_H$ is expressed according to an equation (12) by rearranging the equation (1) by use of the gain KH expressed in the equation (7).

$$V_H = V_{href} - Cf*(Iq-Iq0) \quad (12)$$

Therefore, because the voltage-up ratio n of the transformer 22 does not exist in the equation (12), even though the tap position m of the transformer 22 is changed, the voltage drooping factor Cf in the transmission voltage control can be maintained to a constant value.

Accordingly, because the gain KH of the transmission voltage control is calculated according to the tap position m of the transformer 22 detected in the tap position detecting circuit 23 in the gain calculating circuit 26, even though the tap position m of the transformer 22 is changed to change the voltage-up ratio n of the transformer 22, the gain KH of the transmission voltage control is changed with the voltage-up ratio n so as to maintain the voltage drooping factor Cf defined in the equation (6) to a constant value. Therefore, the stability of the transmission voltage $V_H$ in the power transmission system can be maintained even though the tap position m of the transformer 22 is changed.

Also, even though a plurality of synchronous generators are connected with the transformer 22, because the drooping voltage factor Cf in the transmission voltage control is maintained at a constant value, reactive currents Iq of the synchronous generators are well balanced with each other, so that the stability of the transmission voltage $V_H$ of the power transmission system can be maintained.

Embodiment 2

Figure 2:
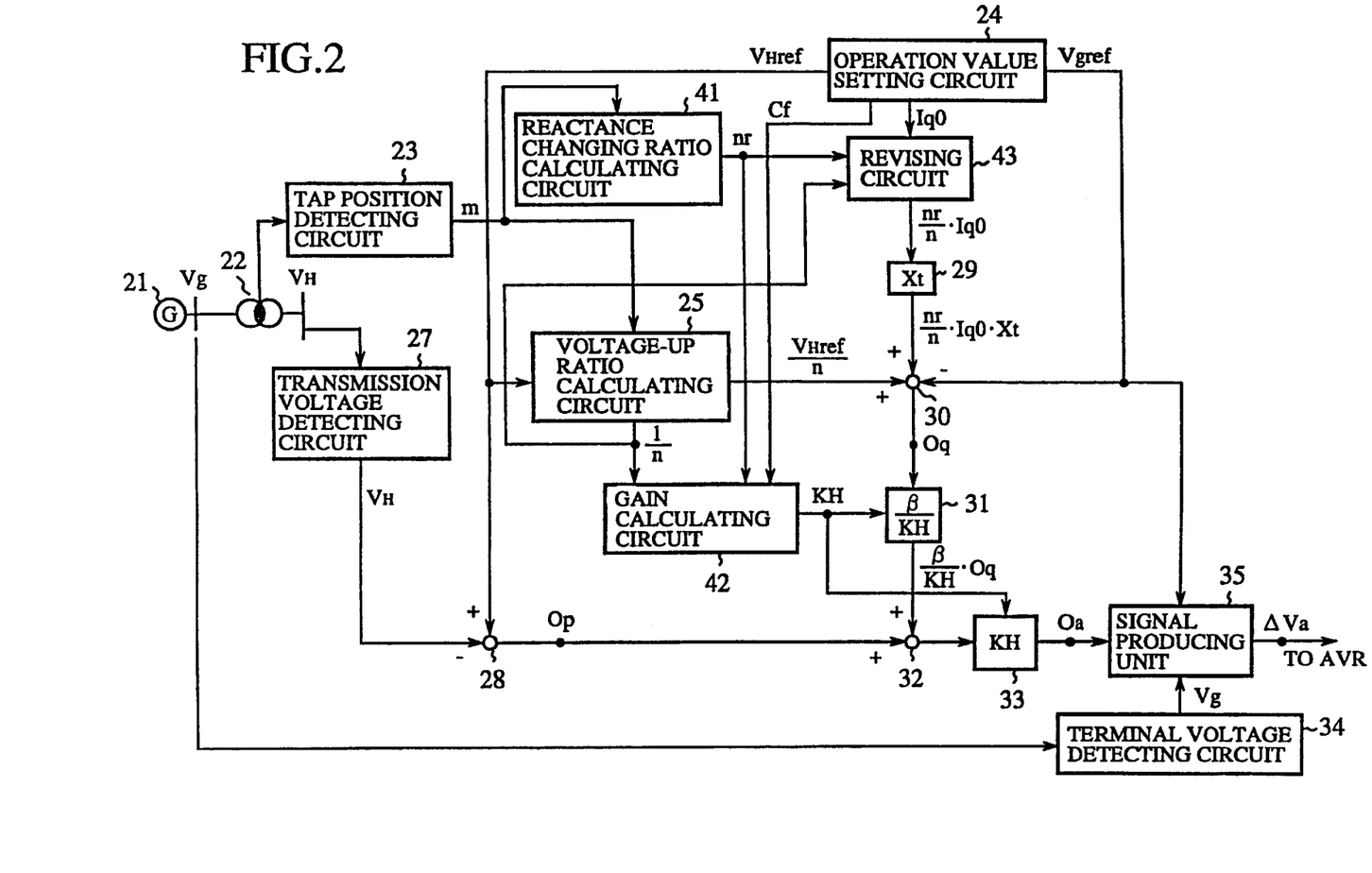
FIG. 2 is a constitutional diagram of an excitation control apparatus of a synchronous generator according to a second embodiment of the present invention.

FIG. 2 is a constitutional diagram of an excitation control apparatus of a synchronous generator according to a second embodiment of the present invention. Because constitutional elements of the excitation control apparatus indicated in FIG. 2 by the same reference numerals as those shown in FIG. 1 are the same as those in FIG. 1, the detail description of the constitutional elements shown in FIG. 2 is omitted.

In FIG. 2, a reference numeral 41 indicates a reactance changing ratio calculating circuit for calculating a reactance changing ratio nr of the transformer 22 from the tap position m of the transformer 22 detected in the tap position detecting circuit 23, and a reference numeral 42 indicates a gain calculating circuit for calculating a gain KH of the transmission voltage control from the voltage drooping factor Cf set in the operation value setting circuit 24, the inverse value of the voltage-up ratio n calculated in the voltage-up ratio calculating circuit 25 and the reactance changing ratio nr calculated in the reactance changing ratio calculating circuit 41. Here, a gain calculating means is composed of the reactance changing ratio calculating circuit 41 and the gain calculating circuit 42. A reference numeral 43 indicates a revising circuit (functioning as a revising means) for multiplying the reference value Iq0 of the reactive current Iq of the synchronous generator 21 by the reactance changing ratio nr calculated in the reactance changing ratio calculating circuit 41 and the inverse value of the voltage-up ratio n calculated in the voltage-up ratio calculating circuit 25 to revise the reference value Iq0 of the reactive current Iq to a revised reference value (nr/n)*Iq0.

In the above configuration, an operation of the excitation control apparatus is described.

The above-described second drawback is solved in the second embodiment in cases where a core-type transformer is used as the transformer 22. That is, even though the tap position m of the transformer 22 is changed, not only the gain KH corresponding to the tap position m of the transformer 22 is always calculated in an on-line operation so as to maintain the voltage drooping factor Cf in the transmission voltage control at a constant value, but also the occurrence of a deviation of the reactive current Iq from the reference value Iq0 of the reactive current Iq is prevented in the on-line operation.

In brief, in cases where the reference value Iq0 of the reactive current Iq is replaced with a revised reference value (nr/n)*Iq0 expressed in a replacing relationship (13), the characteristic of the transmission voltage $V_H$ expressed according to the equation (5) of the core-type transformer is revised to a characteristic of the transmission voltage VH expressed according to an equation (14).

$$Iq0 \rightarrow (nr/n)*Iq0 \tag{13}$$

$$VH = VHref - nr*\beta*Xt/(\beta+n*KH)*(Iq-Iq0) \tag{14}$$

The equation (14) holds in the transmission voltage control in case of the use of the core-type transformer on condition that the replacing relationship (13) is satisfied in this second embodiment.

In cases where the transmission voltage VH agrees with its reference value VHref, the reactive current Iq also agrees with its reference value Iq0. Therefore, even though a type of transformer represented by the core-type transformer, in which the change of the voltage-up ratio n is not proportional to the change of the reactance changing ratio nr, is used as the transformer 22, the occurrence of a deviation of the reactive current Iq from an operation point of the synchronous generator 21 agreeing with the reference value Iq0 can be prevented.

Also, a coefficient of the second term (Iq–Iq0) of the equation(14) is defined as a voltage drooping factor Cf in the transmission voltage control as is expressed according to an equation (15).

$$Cf = nr*\beta*Xt/,\beta+n*KH) \tag{15}$$

To prevent the change of the voltage drooping factor Cf in the transmission voltage control caused by the change of the tap position m of the transformer 22, the equation (15) is rewritten to an equation (16) to obtain the gain KH.

$$KH = \beta*\{nr*Xt/(n*Cf) - 1/n\} \tag{16}$$

The voltage-up ratio n of the transformer 22 and the reactance changing ratio nr corresponding to the tap position m of the transformer 22 are calculated and used for the equation (16), and the drooping gain KH is calculated.

Therefore, even though the tap position m of the transformer 22 is changed, because the gain KH corresponding to the tap position m is used to control the transmission voltage $V_H$ to a constant value, the drooping voltage factor Cf in the transmission voltage control can be maintained at a constant value regardless of the change of the tap position m.

An opertion of the excitation control apparatus according to the second embodiment is described in detail.

In the operation value setting circuit 24, a drooping voltage factor Cf of the power transmission system in the transmission voltage control is initially set while considering conditions of the power transmission system and the like, and a reference value $V_{Href}$ of a transmission voltage VH, a reference value Iq0 of a reactive current Iq of the synchronous generator 21 and a reference value $V_{gref}$ of a terminal voltage Vg of the synchronous generator 21 are initially set.

In this case, as the number of synchronous generators 21 operated in parallel to each other is increased, it becomes more difficult to obtain well-balanced reactive currents Iq of the synchronous generators 21. Therefore, the voltage drooping factor Cf in the transmission voltage control is set to a sufficiently high value. In contrast, in cases where the number of synchronous generators 21 operated in parallel to each other is decreased, the voltage drooping factor Cf in the transmission voltage control is set to a lower value.

Thereafter, when the transmission voltage $V_H$ actually applied to the power transmission system is detected in the transmission voltage detecting circuit 27, the transmission voltage $V_H$ is subtracted in the subtracting unit 28 from the reference value $V_{Href}$ of the transmission voltage $V_H$ set in the operation value setting circuit 24, and a subtracting result Op is output from the subtracting unit 28 to the adding unit 32 (refer to the equation (8)).

Also, when the voltage drooping factor Cf is set in the operation value setting circuit 24, the inverse value of the voltage-up ratio n is calculated in the voltage-up ratio calculating circuit 25, and a reactance changing ratio nr is calculated in the reactance changing ratio calculating circuit 41. Thereafter, to prevent the occurrence of a deviation of the reactive current Iq from the reference value Iq0 of the reactive current Iq, the reference value Iq0 of the reactive current Iq set in the operation value setting circuit 24 is revised in the revising circuit 43 by using the reactance changing ratio nr and the inverse value of the voltage-up ratio n to revise the reference value Iq0 of the reactive current Iq. That is, the reference value Iq0 of the reactive current Iq is multiplied by a value nr/n to obtain a revised reference value (nr/n)*Iq0.

Thereafter, a multiplied result $V_{Href}/n$ of the voltage-up ratio calculating circuit 25 and a multiplied result (nr/n)*Iq0*Xt of the multiplier 29 are added together in the adding and subtracting unit 30, and the reference value $V_{gref}$ of the terminal voltage Vg of the synchronous generator 21 is subtracted from an added result $V_{Href}/n+(nr/n)*Iq0*Xt$ in the adding and subtracting unit 30 to obtain an added-subtracted result Oq.

$$Oq=(nr/n)*Iq0*Xt-V_{gref}+V_{Href}/n \quad (17)$$

Also, a gain $K_H$ of the transmission voltage control is calculated in the gain calculating circuit 42 by using the drooping factor Cf, the inverse value of the voltage-up ratio n calculated in the voltage-up ratio calculating circuit 25 and the reactance changing ratio nr calculated in the reactance changing ratio calculating circuit 41 (refer to the equation (16)).

Thereafter, in the multiplier 31, the gain reducing coefficient β is divided by the gain $K_H$ calculated in the gain calculating circuit 42, and the added-subtracted result Oq obtained in the adding and subtracting unit 30 is multiplied by a divided result $β/K_H$.

After the subtracting result Op obtained in the subtracting unit 28 and a multiplying result $(β/K_H)*Oq$ of the multiplier 31 are added together in the adding unit 32, an adding result $Op+(β/K_H)*Oq$ of the adding unit 32 is multiplied by the gain $K_H$ of the transmission voltage control in the amplifier 33, and a multiplying result Oa is output to the signal producing unit 35 (refer to the equation (10)).

In the signal producing unit 35, a deviation between the reference value $V_{gref}$ set in the operation value setting circuit 24 and the terminal voltage Vg detected in the terminal voltage detecting circuit 34 is multiplied by the gain reducing coefficient β, and this multiplied result $β*(V_{gref}-Vg)$ and the multiplied result Oa of the multiplier 33 are added together to obtain an added result ΔVa (refer to the equation (11)).

The added result ΔVa is output to the auto-voltage regulator AVR (not shown).

Thereafter, the terminal voltage Vg of the synchronous generator 21 is regulated according to the added result ΔVa in the auto-voltage regulator AVR to control the transmission voltage $V_H$ to a constant value. In cases where the synchronous generator 21 is operated in a steady state, ΔVa=0 is satisfied. Also, the relationship between the terminal voltage Vg of the synchronous generator 21 and the transmission voltage $V_H$ is expressed according to the equation (4).

Therefore, the equation (14) is obtained by rearranging the equation (11) by use of the equation (4) of the core-type transformer, the equation (8), the equation (17), the equation (10) and ΔVa=0.

In the equation (14), in cases where the transmission voltage $V_H$ agrees with its reference value $V_{Href}$, the reactive current Iq also agrees with its reference value Iq0. Therefore, even though a type of transformer, in which the change of the voltage-up ratio n is not proportional to the change of the reactance changing ratio n, is used as the transformer 22, the occurrence of a deviation of the reactive current Iq from the reference value Iq0 can be prevented.

Also, the transmission voltage VH is expressed according to an equation (12) by rearranging the equation (14) by use of the gain $K_H$ expressed in the equation (16). Therefore, because the voltage-up ratio n of the transformer 22 does not exist in the equation (12), even though the tap position m of the transformer 22 is changed, the voltage drooping factor Cf in the transmission voltage control can be maintained to a constant value.

Accordingly, even though a type of transformer represented by the core-type transformer, in which the change of the voltage-up ratio n is not proportional to the change of the reactance changing ratio n, is used as the transformer 22, because the reference value Iq0 of the reactive current Iq is replaced with the revised reference value (nr/n)*Iq0 in the revising circuit 43 and because the gain $K_H$ of the transmission voltage control corresponding to the tap position m of the transformer 22 detected in the tap position detecting circuit 23 is calculated in the gain calculating circuit 42, the occurrence of a deviation of the reactive current Iq from the reference value Iq0 can be prevented, and the drooping factor Cf in the transmission voltage control can be maintained to a constant value. Therefore, even though the tap position m of the transformer 22 is changed, the stability of the transmission voltage VH in the power transmission system can be maintained.

Also, because the voltage drooping factor Cf in the transmission voltage control is maintained at a constant value, even though a plurality of synchronous generators are connected with one core-type transformer used as the transformer 22, reactive currents Iq of the synchronous generators are well-balanced with each other, so that the stability of the transmission voltage VH of the power transmission system can be maintained.

Embodiment 3

Figure 3:
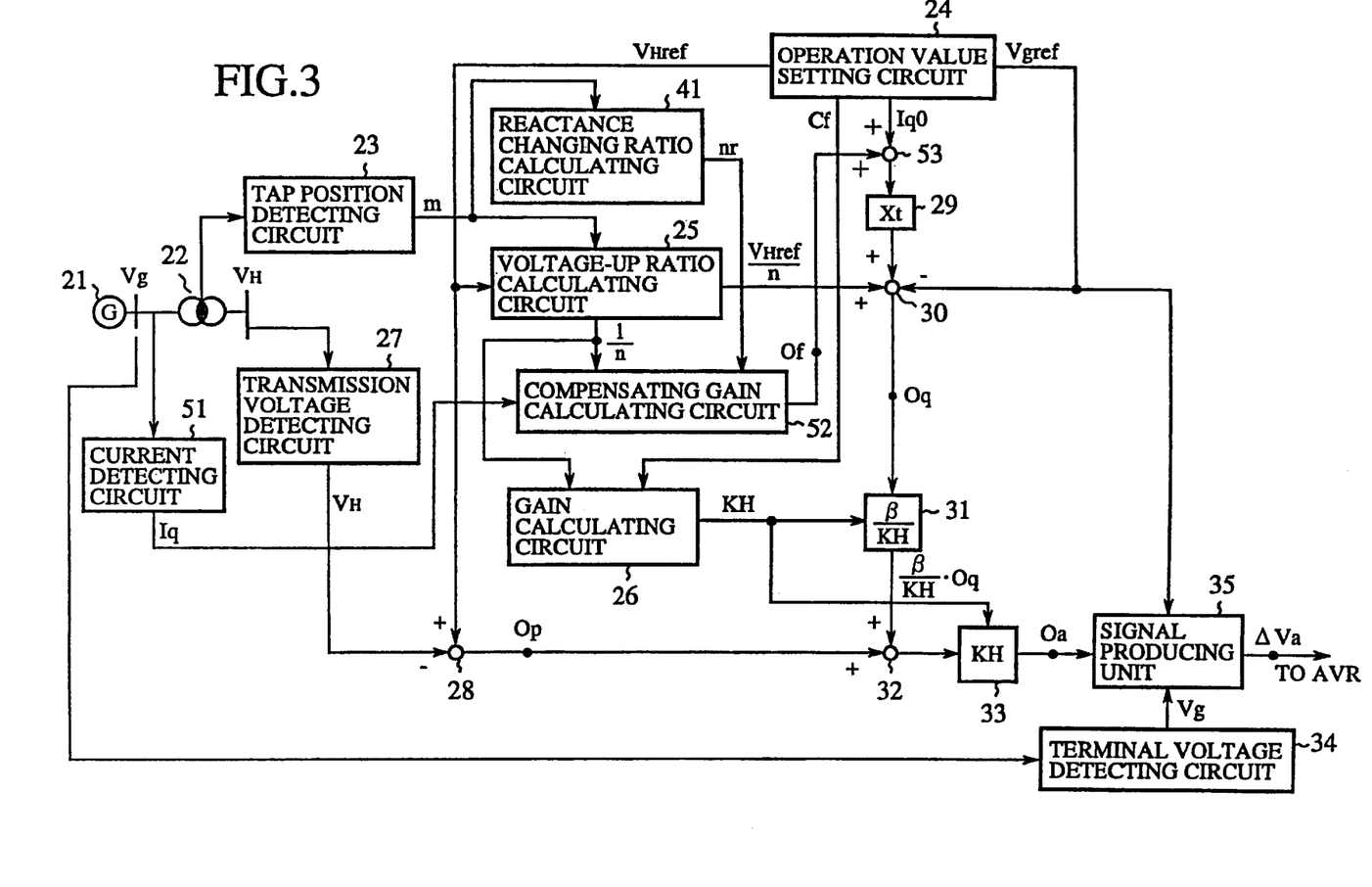
FIG. 3 is a constitutional diagram of an excitation control apparatus of a synchronous generator according to a third embodiment of the present invention.

FIG. 3 is a constitutional diagram of an excitation control apparatus of a synchronous generator according to a third embodiment of the present invention. Because constitutional elements of the excitation control apparatus indicated in FIG. 3 by the same reference numerals as those shown in FIG. 1 and FIG. 2 are the same as those in FIG. 1 and FIG. 2, the detail description of the constitutional elements shown in FIG. 3 is omitted.

In FIG. 3, a reference numeral 51 indicates a current detecting circuit (functioning as a reactive current detecting means) for detecting a reactive current Iq of the synchronous generator 21, a reference numeral 52 indicates a compensating gain calculating circuit for subtracting the voltage-up ratio n calculated in the voltage-up ratio calculating circuit 25 from the reactance changing ratio nr of the transformer 22 calculated in the reactance changing ratio calculating circuit 41, dividing a subtracted result (nr−n) by the voltage-up ratio n and multiplying the reactive current Iq of the synchronous generator 21 detected in the current detecting circuit 51 by a divided result (nr/n−1) to produce a compensating signal Of as a compensating gain, and a reference numeral 53 indicates an adding unit for adding the compensating signal Of produced in the compensating gain calculating circuit 52 to the reference value Iq0 of the reactive current Iq set in the operation value setting circuit 24.

Here, a compensating means is composed of the reactance changing ratio calculating circuit 41, the compensating gain calculating circuit 52 and the adding unit 53.

In the second embodiment, to prevent the occurrence of a deviation of the reactive current Iq from the reference value Iq0, the reference value Iq0 of the reactive current Iq is replaced with (nr/n)*Iq0 according to the replacing relationship (13) to change the characteristic of the transmission voltage VH expressed in the equation (5) of the core-type transformer to the characteristic of the transmission voltage VH expressed in the equation (14). However, in this third embodiment, to prevent the occurrence of a deviation of the reactive current Iq from the reference value Iq0, a compensating gain is always calculated in an on-line operation by using the reactive current Iq of the synchronous generator 21, the voltage-up ratio n of the transformer 22 and the reactance changing ratio nr, and the compensating gain is added to the reference value Iq0 of the reactive current Iq to compensate the reference value Iq0 for the change of the voltage-up ratio n not proportional to the change of the reactance changing ratio nr in the core-type transformer.

That is, the reference value Iq0 of the reactive current Iq is replaced with a compensating reference value (Iq0+(nr/n−1)*Iq expressed in a replacing relationship (18) and (19).

$$Iq0 \rightarrow Iq0+Of \quad (18)$$

$$Of=(nr/n-1)*Iq \quad (19)$$

In this case, the characteristic of the transmission voltage VH expressed according to the equation (5) of the core-type transformer is revised to the characteristic of the transmission voltage VH expressed according to the equation (1) of the shell type transformer.

In the equation (1), in cases where the transmission voltage VH agrees with its reference value VHref, the reactive current Iq also agrees with its reference value Iq0. Therefore, even though a type of transformer represented by the core-type transformer, in which the change of the voltage-up ratio n is not proportional to the change of the reactance changing ratio nr, is used as the transformer 22, the occurrence of a deviation of the reactive current Iq from an operation point of the synchronous generator 21 agreeing with the reference value Iq0 can be prevented in the third embodiment in the same manner as in the case of the use of the shell type transformer.

In the operation value setting circuit 24, a voltage drooping factor Cf of the power transmission system in the transmission voltage control is initially set while considering conditions of the power transmission system and the like, and a reference value $V_{Href}$ of a transmission voltage VH, a reference value Iq0 of a reactive current Iq of the synchronous generator 21 and a reference value $V_{gref}$ of a terminal voltage Vg of the synchronous generator 21 are initially set.

In this case, as the number of synchronous generators 21 operated in parallel to each other is increased, it becomes more difficult to obtain well-balanced reactive currents Iq of the synchronous generators 21. Therefore, the voltage drooping factor Cf in the transmission voltage control is set to a sufficiently high value. In contrast, in cases where the number of synchronous generators 21 operated in parallel to each other is decreased, the voltage drooping factor Cf in the transmission voltage control is set to a lower value.

Thereafter, when the transmission voltage VH actually applied to the power transmission system is detected in the transmission voltage detecting circuit 27, the transmission voltage VH is subtracted in the subtracting unit 28 from the reference value VHref of the transmission voltage VH set in the operation value setting circuit 24, and a subtracting result Op is output from the subtracting unit 28 to the adding unit 32 (refer to the equation (8)).

Also, when the voltage drooping factor Cf is set in the operation value setting circuit 24, the inverse value of the voltage-up ratio n is calculated in the voltage-up ratio calculating circuit 25, and a gain KH of the transmission voltage control is calculated by using the voltage drooping factor Cf and the inverse value of the voltage-up ratio n in the gain calculating circuit 26 (refer to the equation (7)).

Thereafter, in the compensating gain calculating circuit 52, to prevent the occurrence of a deviation of the reactive current Iq from the reference value Iq0, the voltage-up ratio n is subtracted from the reactance changing ratio nr of the transformer 22, a subtracted result (nr−n) is divided by the voltage-up ratio n, and the reactive current Iq of the synchronous generator 21 is multiplied by a divided result (nr/n−1). Therefore, a compensating signal Of is produced (refer to the equation (19)).

Thereafter,in the adding unit 53, the compensating signal Of is added to the reference value Iq0 of the reactive current Iq set in the operation value setting circuit 24.

Thereafter, the multiplied result VHref/n of the voltage-up ratio calculating circuit 25 and a multiplied result (Iq0+Of)*Xt of the multiplier 29 are added together in the adding and subtracting unit 30, and the reference value Vgref of the terminal voltage Vg of the synchronous generator 21 is subtracted from an added result {VHref/n+(Iq0+Of)*Xt} in the adding and subtracting unit 30 to obtain an added-subtracted result Oq.

$$Oq=Xt*\{Iq0+(nr/n-1)*Iq\}+V_{Href}/n-V_{gref} \quad (20)$$

Thereafter, in the multiplier 31, the gain reducing coefficient β is divided by the gain KH calculated in the gain calculating circuit 26, the added-subtracted result Oq obtained in the adding and subtracting unit 30 is multiplied by a divided result β/KH.

After the subtracting result Op obtained in the subtracting unit 28 and a multiplying result(β/KH)*Oq of the multiplier 31 are added together in the adding unit 32, an adding result Op+(β/KH)*Oq of the adding unit 32 is multiplied by the gain KH of the transmission voltage control in the amplifier 33, and a multiplying result Oa is output to the signal producing unit 35(refer to the equation (10)).

In the signal producing unit 35, a deviation between the reference value Vgref set in the operation value setting circuit 24 and the terminal voltage Vg detected in the terminal voltage detecting circuit 34 is multiplied by the gain reducing coefficient β, and this multiplied result β*(Vgref−Vg) and the multiplied result Oa of the multiplier 33 are added together to obtain an added result ΔVa (refer to the equation (11)). The added result ΔVa is output to the auto-voltage regulator AVR (not shown).

Thereafter, the terminal voltage vg of the synchronous generator 21 is regulated according to the added result ΔVa in the auto-voltage regulator AVR to control the transmission voltage VH to a constant value. In cases where the synchronous generator 21 is operated in a steady state, $\Delta$Va=0 is satisfied. Also, the relationship between the terminal voltage Vg of the synchronous generator 21 and the transmission voltage VH is expressed according to the equation (4).

Therefore, the equation (1) is obtained by rearranging the equation (11) by use of the equation (4) of the core-type transformer, the equation (8), the equation (20), the equation (10) and $\Delta$Va=0.

In the equation (1), in cases where the transmission voltage VH agrees with its reference value VHref, the reactive current Iq also agrees with its reference value Iq0. Therefore, even though a type of transformer, in which the change of the voltage-up ratio n is not proportional to the change of the reactance changing ratio nr, is used as the transformer 22, the occurrence of a deviation of the reactive current Iq from the reference value Iq0 can be prevented.

Also, the transmission voltage $V_H$ is expressed according to the equation (12) which is obtained by rearranging the equation (1) by use of the gain KH expressed in the equation (7). Therefore, because the voltage-up ratio n of the transformer 22 does not exist in the equation (12), even though the tap position m of the transformer 22 is changed, the voltage drooping factor Cf in the transmission voltage control can be maintained to a constant value.

Accordingly, even though a type of transformer represented by the core-type transformer, in which the change of the voltage-up ratio n is not proportional to the change of the reactance changing ratio nr, is used as the transformer 22, because the reference value Iq0 of the reactive current Iq is replaced with the compensating reference value (Iq0+Of) expressed in the replacing relationship (18) by the function of the current detecting circuit 51, the compensating gain calculating circuit 52 and the adding unit 53 and because the gain KH of the transmission voltage control corresponding to the tap position m of the transformer 22 is calculated in the gain calculating circuit 26, the occurrence of a deviation of the reactive current Iq from the reference value Iq0 can be prevented, and the voltage drooping factor Cf in the transmission voltage control can be maintained to a constant value. Therefore, even though the tap position m of the transformer 22 is changed, the stability of the transmission voltage $V_H$ in the power transmission system can be maintained.

Also, because the voltage drooping factor Cf in the transmission voltage control is maintained at a constant value, even though a plurality of synchronous generators are connected with one core-type transformer used as the transformer 22, reactive currents Iq of the synchronous generators are well-balanced with each other, so that the stability of the transmission voltage $V_H$ of the power transmission system can be maintained.

Embodiment 4

Figure 4:
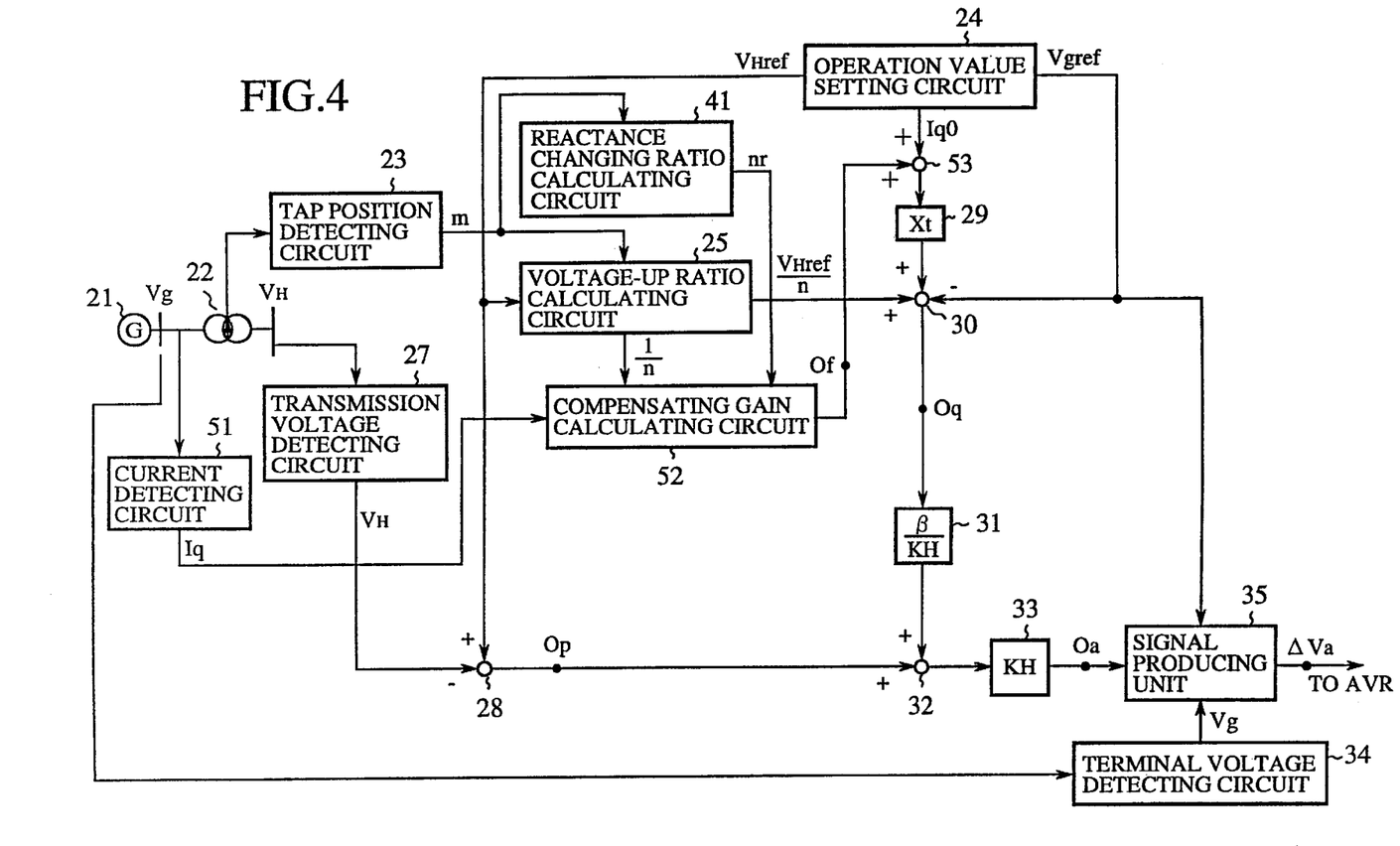
FIG. 4 is a constitutional diagram of an excitation control apparatus of a synchronous generator according to a fourth embodiment of the present invention.

FIG. 4 is a constitutional diagram of an excitation control apparatus of a synchronous generator according to a fourth embodiment of the present invention.

In the third embodiment, the gain KH is calculated in the gain calculating circuit 26 to maintain the drooping factor Cf in the transmission voltage control to a constant value.

However, in this fourth embodiment, as shown in FIG. 4, the occurrence of a deviation of the reactive current Iq from the reference value Iq0 is prevented in an on-line operation without using the gain calculating circuit 26, so that the stability of the transmission voltage $V_H$ in the power transmission system can be maintained.

An operation of the excitation control apparatus according to the fourth embodiment is described.

A reference value VHref of a transmission voltage VH, a reference value Iq0 of a reactive current Iq of the synchronous generator 21 and a reference value Vgref of a terminal voltage vg of the synchronous generator 21 are initially set in the operation value setting circuit 24.

Thereafter, when the transmission voltage VH actually applied to the power transmission system is detected in the transmission voltage detecting circuit 27, the transmission voltage VH is subtracted in the subtracting unit 28 from the reference value VHref of the transmission voltage VH set in the operation value setting circuit 24 to produce the subtracting result Op, and the subtracting result Op is output from the subtracting unit 28 to the adding unit 32 (refer to the equation (8)).

Also, the inverse value of the voltage-up ratio n is calculated in the voltage-up ratio calculating circuit 25.

Thereafter, in the compensating gain calculating circuit 52, to prevent the occurrence of a deviation of the reactive current Iq from the reference value Iq0, the voltage-up ratio n is subtracted from the reactance changing ratio nr of the transformer 22, a subtracted result (nr−n) is divided by the voltage-up ratio n, and the reactive current Iq of the synchronous generator 21 is multiplied by a divided result (nr/n−1). Therefore, the compensating signal Of is produced (refer to the equation (19)).

Thereafter, in the adding unit 53, the compensating signal Of is added to the reference value Iq0 of the reactive current Iq set in the operation value setting circuit 24.

Thereafter, the multiplied result VHref/n of the voltage-up ratio calculating circuit 25 and a multiplied result (Iq0+Of)*Xt of the multiplier 29 are added together in the adding and subtracting unit 30, and the reference value Vgref of the terminal voltage Vg of the synchronous generator 21 is subtracted from an added result {VHref/n+(Iq0+Of)*Xt} in the adding and subtracting unit 30 to obtain the added-subtracted result Oq (refer to the equation (20)).

Thereafter, in the multiplier 31, the gain reducing coefficient $\beta$ is divided by a gain KH set to prescribed value, the added-subtracted result Oq obtained in the adding and subtracting unit 30 is multiplied by a divided result $\beta$/KH. The prescribed value of the drooping gain KH is, for example, determined by analyzing the configuration of a power transmission line of the power transmission system. Also, it is applicable that the prescribed value of the drooping gain KH be exponentially determined.

After the subtracting result Op obtained in the subtracting unit 28 and a multiplying result($\beta$/KH)*Oq of the multiplier 31 are added together in the adding unit 32, an adding result Op+($\beta$/KH)*Oq of the adding unit 32 is multiplied by the gain KH in the amplifier 33, and a multiplying result Oa is output to the signal producing unit 35(refer to the equation (10)).

In the signal producing unit 35, a deviation between the reference value Vgref set in the operation value setting circuit 24 and the terminal voltage Vg detected in the terminal voltage detecting circuit 34 is multiplied by the gain reducing coefficient $\beta$, and this multiplied result $\beta$*(Vgref−Vg) and the multiplied result Oa of the multiplier 33 are added together to obtain an added result $\Delta$Va (refer to the equation (11)). The added result $\Delta$Va is output to the auto-voltage regulator AVR (not shown).

Thereafter, the terminal voltage Vg of the synchronous generator 21 is regulated according to the added result $\Delta$Va in the auto-voltage regulator AVR to control the transmission voltage $V_H$ to a constant value. In cases where the synchronous generator 21 is operated in a steady state, $\Delta Va=0$ is satisfied. Also, the relationship between the terminal voltage Vg of the synchronous generator 21 and the transmission voltage $V_H$ is expressed according to the equation (4).

Therefore, the equation (1) is obtained by rearranging the equation (11) by use of the equation (4) of the core-type transformer, the equation (8), the equation (20), the equation (10) and $\Delta Va=0$.

In the equation (1), in cases where the transmission voltage $V_H$ agrees with its reference value $V_{Href}$, the reactive current Iq also agrees with its reference value Iq0. Therefore, even though a type of transformer, in which the change of the voltage-up ratio n is not proportional to the change of the reactance changing ratio nr, is used as the transformer 22, the occurrence of a deviation of the reactive current Iq from the reference value Iq0 can be prevented.

Accordingly, even though a type of transformer represented by the core-type transformer, in which the change of the voltage-up ratio n is not proportional to the change of the reactance changing ratio nr, is used as the transformer 22, because the reference value Iq0 of the reactive current Iq is replaced with the compensating reference value (Iq0+Of) expressed in the replacing relationship (18) by the function of the current detecting circuit 51, the compensating gain calculating circuit 52 and the adding unit 53, the occurrence of a deviation of the reactive current Iq from the reference value Iq0 can be prevented. Therefore, even though the tap position m of the transformer 22 is changed, the stability of the transmission voltage $V_H$ in the power transmission system can be maintained.

What is claimed is:

1. An excitation control apparatus of a synchronous generator comprising:
   tap position detecting means for detecting a tap position of a transformer arranged between a synchronous generator and a power transmission system;
   gain calculating means for calculating gain of a transmission voltage control according to the tap position of the transformer detected by the tap position detecting means to maintain a voltage drooping factor of the power transmission system in the transmission voltage control at an expected value; and
   voltage control means for controlling a transmission voltage of the power transmission system according to the gain calculated by the gain calculating means and a reference value.

2. The excitation control apparatus of a synchronous generator according to claim 1, wherein the gain calculating means comprises:
   an operation value setting circuit for setting a voltage drooping factor of the power transmission system in the transmission voltage control;
   a voltage-up ratio calculating circuit for calculating a voltage-up ratio of the transformer from the tap position of the transformer detected by the tap position detecting means; and
   a gain calculating circuit for calculating the gain in the transmission voltage control from the voltage drooping factor set by the operation value setting circuit and the voltage-up ratio calculated by the voltage-up ratio calculating circuit.

3. The excitation control apparatus of a synchronous generator according to claim 2, including at least one synchronous generator wherein the voltage drooping factor is set by the operation value setting circuit according to the number of synchronous generators.

4. The excitation control apparatus of a synchronous generator according to claim 2, wherein the gain calculating circuit divides a rated reactance value of the transformer by the drooping factor set by the operation value setting circuit to produce a division result, subtracts an inverse value of the voltage-up ratio of the transformer from the division result to produce a subtraction result, and multiplies the subtraction result by a gain reducing coefficient to produce the gain.

5. The excitation control apparatus of a synchronous generator according to claim 1, wherein the gain in the transmission voltage control is always calculated in an on-line operation by the gain calculating means.

6. The excitation control apparatus of a synchronous generator according to claim 1, wherein the voltage control means comprises revising means for revising a reference current value of a reactive current of the synchronous generator to a revised reference current value according to the tap position of the transformer detected by the tap position detecting means in an on-line operation, and the revised reference current value is used as the reference value by the voltage control means.

7. The excitation control apparatus of a synchronous generator according to claim 6, wherein the gain calculating means comprises:
   an operation value setting circuit for setting a voltage drooping factor of the power transmission system in the transmission voltage control and setting the reference current value of the reactive current of the synchronous generator;
   a voltage-up ratio calculating circuit for calculating a voltage-up ratio of the transformer from the tap position of the transformer detected by the tap position detecting means;
   a reactance changing ratio calculating circuit for calculating a reactance changing ratio of the transformer from the tap position of the transformer detected by the tap position detecting means; and
   a gain calculating circuit for calculating the gain in the transmission voltage control from the voltage drooping factor set by the operation value setting circuit, the voltage-up ratio calculated by the voltage-up ratio calculating circuit, and the reactance changing ratio calculated by the reactance changing ratio calculating circuit.

8. The excitation control apparatus of a synchronous generator according to claim 7, wherein the gain calculating circuit multiplies the reactance changing ratio calculated by the reactance changing ratio calculating circuit by a rated reactance value of the transformer to produce a first multiplication result, divides the first multiplication result by a second multiplication result, obtained by multiplying the drooping factor set by the operation value setting circuit by the voltage-up ratio calculated by the voltage-up ratio calculating circuit, to produce a first division result, subtracts an inverse value of the voltage-up ratio of the transformer from the first division result to produce a subtraction result, and multiplies the subtraction result by a gain reducing coefficient to obtain the gain.

9. The excitation control apparatus of a synchronous generator according to claim 7, wherein the revising means divides the reactance changing ratio calculated by the reactance changing ratio calculating circuit by the voltage-up ratio calculated by the voltage-up ratio calculating circuit to produce a second division result and multiplies the second division result by the reference current value of the reactive current to produce the revised reference current value.

10. The excitation control apparatus of a synchronous generator according to claim 1, wherein the excitation control apparatus of the synchronous generator further comprises:

reactive current detecting means for detecting a reactive current of the synchronous generator; and compensating means for compensating a reference current value of the reactive current of the synchronous generator for a change in the tap position, using the reactive current of the synchronous generator detected by the reactive current detecting means and the tap position detected by the tap position detecting means, the reference current value being used as the reference value by the voltage control means.

11. The excitation control apparatus of a synchronous generator according to claim 10, wherein the gain calculating means comprises:

an operation value setting circuit for setting a voltage drooping factor of the power transmission system in the transmission voltage control and setting the reference current value of the reactive current of the synchronous generator;

a voltage-up ratio calculating circuit for calculating a voltage-up ratio of the transformer from the tap position of the transformer detected by the tap position detecting means; and a gain calculating circuit for calculating the gain in the transmission voltage control from the voltage drooping factor set by the operation value setting circuit and the voltage-up ratio calculated by the voltage-up ratio calculating circuit.

12. The excitation control apparatus of a synchronous generator according to claim 11, wherein the compensating means calculates a reactance changing ratio of the transformer from the tap position detected by the tap position detecting means, subtracts the voltage-up ratio calculated by the voltage-up ratio calculating circuit from the reactance changing ratio to produce a subtraction result, divides the subtraction result by the voltage-up ratio to produce a division result, multiplies the reactive current detected by the reactive current detecting means by the division result to produce a multiplication result, and adds the multiplication result to the reference current value of the reactive current set by the operation value setting circuit to compensate the reference current value of the reactive current of the synchronous generator for the change of the tap position in an on-line operation.

13. An excitation control apparatus of a synchronous generator comprising:

tap position detecting means for detecting a tap position of a transformer arranged between a synchronous generator and a power transmission system;

reactive current detecting means for detecting an reactive current of the synchronous generator;

compensating means for compensating a reference current value of the reactive current of the synchronous generator for a change in the tap position, using the reactive current of the synchronous generator detected by the reactive current detecting means and the tap position detected by the tap position detecting means; and voltage control means for controlling a transmission voltage of the power transmission system according to the reference current value of the reactive current compensated by the compensating means.

14. The excitation control apparatus of a synchronous generator according to claim 13, wherein the compensating means calculates a voltage-up ratio of the transformer and a reactance changing ratio of the transformer from the tap position detected by the tap position detecting means, subtracts the voltage-up ratio from the reactance changing ratio to produce a subtraction result, divides the subtraction result by the voltage-up ratio to produce a division result, multiplies the reactive current of the synchronous generator by the division result to produce a multiplication result, and adds the multiplication result to the reference current value of the reactive current to compensate the reference current value of the reactive current of the synchronous generator for the change of the tap position in an on-line operation.

* * * * *